United States Patent
Tranninger

(10) Patent No.: US 9,587,095 B2
(45) Date of Patent: Mar. 7, 2017

(54) TRANSPARENT THIN WALL PACKAGING MATERIAL WITH IMPROVED STIFFNESS AND FLOWABILITY

(71) Applicant: BOREALIS AG, Vienna (AT)

(72) Inventor: Cornelia Tranninger, Pucking (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/648,072

(22) PCT Filed: Dec. 5, 2013

(86) PCT No.: PCT/EP2013/003686
§ 371 (c)(1),
(2) Date: May 28, 2015

(87) PCT Pub. No.: WO2014/094990
PCT Pub. Date: Jun. 26, 2014

(65) Prior Publication Data
US 2015/0307698 A1    Oct. 29, 2015

(30) Foreign Application Priority Data

Dec. 21, 2012 (EP) .................................... 12008538

(51) Int. Cl.
C08F 2/01    (2006.01)
C08L 23/10   (2006.01)
C08L 23/12   (2006.01)
C08L 23/14   (2006.01)
C08L 19/00   (2006.01)

(52) U.S. Cl.
CPC ............ *C08L 23/10* (2013.01); *C08L 19/00* (2013.01); *C08L 23/12* (2013.01); *C08L 23/142* (2013.01); *C08L 2201/10* (2013.01); *C08L 2205/02* (2013.01); *C08L 2205/025* (2013.01); *C08L 2207/02* (2013.01); *C08L 2308/00* (2013.01); *C08L 2314/00* (2013.01); *C08L 2314/02* (2013.01)

(58) Field of Classification Search
CPC .......... C08F 2/01; C08F 210/06; C08L 23/12; C08L 23/16; C08L 23/142
USPC ............................ 523/348; 524/528; 525/240
See application file for complete search history.

(56) References Cited

U.S. PATENT DOCUMENTS

2011/0207883 A1    8/2011    Doufas et al.

FOREIGN PATENT DOCUMENTS

| EP | 1 659 151 A1 | 5/2006 |
| EP | 1 801 156 A1 | 6/2007 |
| EP | 1 358 266 B1 | 11/2007 |
| EP | 2 075 284 A1 | 7/2009 |
| EP | 2 174 980 A1 | 4/2010 |
| EP | 2 338 656 A1 | 6/2011 |
| EP | 2 431 416 A1 | 3/2012 |
| EP | 2 452 957 A1 | 5/2012 |
| WO | WO 02/44272 A1 | 6/2002 |
| WO | WO 2011/084468 A1 | 7/2011 |

OTHER PUBLICATIONS

International Preliminary Report on Patentability issued Jun. 23, 2015 for International application No. PCT/EP2013/003686.
International Search Report mailed Jun. 13, 2014 for International application No. PCT/EP2013/003686.
Written Opinion mailed Jun. 13, 2014 for International application No. PCT/EP2013/003686.

*Primary Examiner* — Edward Cain
(74) *Attorney, Agent, or Firm* — Richard M. Klein; Fay Sharpe LLP

(57) ABSTRACT

Heterophasic polypropylene resin having an MFR (2.16 kg, 230° C.) of more than 27 g/10 min, determined according ISO 1133 comprising a propylene homo- or copolymer matrix (A) and an ethylene-propylene rubber phase (B) dispersed within the matrix, wherein the heterophasic polypropylene resin has a fraction insoluble in p-xylene at 25° C. (XCU) in an amount of 75 to 85 wt.-% with a weight average molecular weight of 110 to 190 kg/mol measured by GPC analysis according to ISO 16014-1, and 4, the fraction insoluble in p-xylene at 25° C. (XCU) containing monomer units derived from ethylene in an amount of 12.0 to 21.0 wt.-% and a fraction soluble in p-xylene at 25° C. (XCS) in an amount of 15 to 25 wt.-% having an intrinsic viscosity of 1.4 to 2.0 dl/g, determined according to DIN EN ISO 1628-1 and -3 and being composed of propylene monomer units in an amount of 40 wt.-% or more, and having a glass transition temperature Tg as measured by DSC according to ISO 6721-7 at a compression molded sample consisting of the XCS fraction in the range of −60 to −50° C.

20 Claims, No Drawings

TRANSPARENT THIN WALL PACKAGING MATERIAL WITH IMPROVED STIFFNESS AND FLOWABILITY

The present invention relates to a high flowable heterophasic polypropylene resin comprising a propylene homo- or copolymer matrix and an ethylene-propylene rubber phase dispersed within the matrix and an ethylene homo- or copolymer showing good balance between stiffness, high flowability, high impact strength at low temperatures and low haze. The invention is also concerned with a process for producing the heterophasic polypropylene resin.

High flow and stiff heterophasic copolymers (HECOs) for transparent thin wall packaging applications showing high impact strength at low temperatures as it is required for ice cream packaging are challenging to develop. Transparency requires small particles which do not scatter light. However, small particles are detrimental for low temperature impact strength since crazing is the dominant deformation mechanism at low temperatures. Big particles are needed to initiate crazing. A solution to overcome this problem is to match the density or refractive index of matrix and dispersed phase by adding the right amount of polyethylene to the HECO. Nevertheless, the HECO should have an EPR of low intrinsic viscosity in order to have a good base level for the transparency improvement.

It has been suggested in EP 1 358 266 to use polyolefin compositions comprising a heterophasic propylene/alpha-olefin copolymer and a polyethylene or ethylene copolymer, whereas the melt flow rate (MFR) of the polyethylene at 190° C. is two times higher than the MFR (230° C.) of the heterophasic polypropylene.

EP 2 338 656 discloses a heterophasic polypropylene composition comprising a polypropylene homopolymer, a polypropylene random copolymer, two elastomeric ethylene-propylene copolymer fractions and 5-25% of ethylene homo- or copolymer fraction. The ratio of intrinsic viscosity of the polypropylene homopolymer fraction to the intrinsic viscosity of the matrix (polypropylene homopolymer and polypropylene random copolymer) has to be smaller than 1.

EP 2 431 416 is concerned with heterophasic polypropylene compositions having a good balance of stiffness and haze. However there was still the need for heterophasic polypropylene compositions having improved impact properties particularly at 23° C. preferentially at very low amounts of $C_2$-$C_8$ impact modifiers.

It is object of the present invention to provide a polypropylene resin that shows an excellent balance of high flowability, impact properties and low haze. It is a further object to provide a polypropylene composition obtainable by a multiple reaction stage process having the above mentioned unique balance.

The present invention is based on the inventive concept that the above mentioned balance of high flowability, impact properties and low haze values can be significantly improved by producing a random heterophasic copolymer with a propylene homo- or copolymer matrix and a cross-bimodal ethylene-propylene copolymer of low intrinsic viscosity. A material showing good flowability, good transparency and sufficient impact properties is developed if some polyethylene or combinations of polyethylene and optionally plastomer are added to the heterophasic copolymer.

The present invention thus provides a heterophasic polypropylene resin having an MFR (2.16 kg, 230° C.) of more than 28 g/10 min, determined according to ISO 1133 comprising a propylene homo- or copolymer matrix (A) and an ethylene-propylene rubber phase (B) dispersed within the matrix, wherein the heterophasic polypropylene resin has a fraction insoluble in p-xylene at 25° C. (XCU) in an amount of 72 to 88 wt.-% with a weight average molecular weight of 110 to 190 kg/mol measured by GPC analysis according to ISO 16014-1, and 4, the fraction insoluble in p-xylene at 25° C. (XCU) containing monomer units derived from ethylene in an amount of 12.0 to 21.0 wt.-% and a fraction soluble in p-xylene at 25° C. (XCS) in an amount of 15 to 25 wt.-% having an intrinsic viscosity of 1.4 to 2.0 dl/g, determined according to DIN EN ISO 1628-1 and -3 and being composed of propylene monomer units in an amount of 40 wt.-% or more, and having a glass transition temperature Tg as measured by DSC according to ISO 6721-7 at a compression moulded sample consisting of the XCS fraction in the range of −60 to −50° C.

It has surprisingly been found that the inventive heterophasic polypropylene resins show a high flowability, good impact properties especially at low temperatures and at the same time low haze values. It has further surprisingly been found that the heterophasic polypropylene resin can be made into ultra thin wall articles by injection moulding avoiding sticking to the mould and uneven surface of the resulting article.

The term "polypropylene" denotes a propylene homo- or copolymer or a mixture of such propylene homo- or copolymers.

The term "heterophasic polypropylene resin" denotes a heterophasic composition including a heterophasic polypropylene and a low density polyethylene.

The term "homo- or copolymer matrix" denotes the material which is essentially insoluble in p-xylene under the conditions described below.

The term "ethylene-propylene rubber phase" denotes the material which is essentially dispersed in the matrix and is soluble in p-xylene under the conditions described below.

The term heterophasic polypropylene composition denotes a material consisting of the inventive heterophasic polypropylene resin and at least one nucleating agent and/or at least one additive and/or at least one modifier.

The term ethylene-propylene rubber denotes a substantially amorphous ethylene-propylene copolymer being soluble in cold p-xylene and having a glass transition temperature between −10 to −70° C.

The fraction insoluble in p-xylene at 25° C. (XCU) is meant to be the fraction of the polypropylene resin that is not soluble in p-xylene at 25° C. and a pressure of 1013 hPa representing for the most part isotactic propylene homo- or copolymer and highly crystalline polyethylene.

It is further preferred that the XCU fraction has a weight average molecular weight $M_w$ of 120 to 185 kg/mol, more preferably 125 to 180 kg/mol, still more preferably 130 to 170 kg/mol, most preferably 135 to 160 kg/mol, and a number average molecular weight $M_n$ of 24 to 37 kg/mol, more preferably of 20 to 40 kg/mol, most preferably of 25 to 35 kg/mol, determined by GPC according to ISO 16014-1, and 4.

The XCU-fraction is preferably composed of ethylene monomer units in an amount of 14 to 21 wt.-%, more preferably 16 to 21 wt.-% and most preferably 17 to 21 wt.-%.

In a preferred embodiment the XCU fraction is present in an amount of 76 to 86 wt.-%, more preferably 76 to 85 wt.-%, even more preferably 76 to wt.-%, most preferably 77 to 84 wt.-% of the heterophasic polypropylene resin.

The fraction soluble in p-xylene (XCS) is denoted the fraction of the polypropylene resin that is soluble in p-xylene at 25° C. and a pressure of 1013 hPa representing for the most part amorphous ethylene-propylene copolymer.

The XCS fraction according to the invention preferably comprises two sub-fractions (a) and (b). Preferably the XCS fraction according to the invention consists of two sub-fractions (a) and (b). Even more preferably subfractions (a) and (b) are in-situ blended. The subfractions (a) and (b) are preferably obtainable as described later.

In a preferred embodiment the XCS fraction is present in an amount of 14 to 24 wt.-%, more preferably 15 to 24 wt.-%, even more preferably 16 to 24 wt.-%, most preferably 16 to 23 wt.-% of the heterophasic polypropylene resin.

The XCS fraction comprising two sub-fractions (a) and (b) according to the present invention preferably has a total intrinsic viscosity of 1.3 to 2.0 dl/g, more preferably 1.4 to 1.9 dl/g and most preferably 1.5 to 1.8 dl/g determined according to DIN EN ISO 1628-1 and -3.

It is further preferred that the XCS fraction has a weight average molecular weight $M_w$ of 135 to 170 kg/mol, more preferably 140 to 170 kg/mol, even more preferably 145 to 165 kg/mol and most preferably 145 to 160 kg/mol.

The XCS fraction further preferably has $M_w/Mn$ of above 4, more preferably above 4.5 and most preferably above 4.6.

The XCS-fraction is preferably composed of ethylene monomer units in an amount of below 60 wt.-%. Even more preferably, the XCS-fraction is composed of ethylene monomer units in an amount of 40 to 55 wt.-%. Most preferably the XCS-fraction is composed of ethylene monomer units in an amount of 42 to 53 wt.-%.

The XCS-fraction preferably has a glass transition temperature of −59 to −51° C., and most preferably −57 to −52° C.

The heterophasic polypropylene resin according to the invention has a melt flow rate MFR (2.16 kg, 230° C.) of more than 28 g/10 min, preferably more than 30 g/10 min, even more preferably more than 32 g/10 min and most preferably more than 34 g/10 min determined according to ISO 1133 thus indicating a high flowability of the polypropylene resin i.e. excellent processability. The melt flow rate MFR (2.16 kg, 230° C.) of the heterophasic polypropylene resin according to the invention will usually not be higher than 200 g/10 min.

The heterophasic polypropylene resin according to the invention has a tensile modulus of more than 1000 MPa, preferably more than 1050 MPa, still even more preferably more than 1110 MPa determined according to ISO 527-2 on injection moulded specimens of type 1B(F3/4) prepared in accordance with EN ISO 1873-2.

The tensile modulus of the heterophasic polypropylene resin according to the invention will usually not be higher than 5000 MPa.

The heterophasic polypropylene resin according to the invention preferably has an ethylene content of 26.0 to 34.0 wt.-%, more preferably 27.0 to 33.0 wt.-% and most preferably 28.0 to 32.0 wt.-%.

In a preferred embodiment of the invention a specimen consisting of the heterophasic polypropylene resin preferably has a Charpy notched impact strength at +23° C. of at least 6.5 kJ/m², more preferably at least 7.0 kJ/m², still more preferably at least 7.5 kJ/m², and most preferably at least 8.0 kJ/m².

In a preferred embodiment of the invention a specimen consisting of the heterophasic polypropylene resin preferably has a Charpy notched impact strength at +23° C. of not more than 20 kJ/m², more preferably not more than 15 kJ/m² and most preferably not more than 12 kJ/m².

Moreover a specimen consisting of the heterophasic polypropylene resin has a Charpy notched impact strength at −20° C. of at least 1.5 kJ/m², more preferably at least 1.8 kJ/m², still more preferably at least 2.0 kJ/m², and most preferably at least 2.2 kJ/m².

A specimen consisting of the heterophasic polypropylene resin according to the invention has a Charpy notched impact strength at −20° C. of not more than 8.0 kJ/m², more preferably not more than 6.5 kJ/m², still more preferably not more than 5.0 kJ/m², and most preferably not more than 3.5 kJ/m².

Still further, a specimen consisting of the heterophasic polypropylene resin preferably has a puncture energy at +23° C. of at least 16 J, more preferably of at least 18 J, still more preferably of at least 20 J, most preferably of at least 22 J determined according to ISO 6603-2, and at −20° C. of at least 20 J, more preferably at least 22 J, even more preferably of at least 24 J, and most preferably at least 26 J, determined according to ISO 6603-2.

Furthermore, a specimen consisting of the heterophasic polypropylene resin preferably has a puncture energy at +23° C. of not more than 60, more preferably of not more than 50 J, still more preferably of not more than 40 J, most preferably of not more than 35 J determined according to ISO 6603-2, and at −20° C. of not more than 60 J, more preferably not more than 50 J, even more preferably of not more than 40 J, and most preferably not more than 35 J, determined according to ISO 6603-2.

Furthermore, the heterophasic polypropylene resin preferably have a haze of lower than 52%, more preferably lower than 50%, even more preferably lower than 48%, and most preferably lower than 46% determined on 1 mm injection moulded plaque samples according to ASTM D1003.

Furthermore, the heterophasic polypropylene resin preferably have a haze of lower than 27%, more preferably lower than 25%, even more preferably lower than 23%, and most preferably lower than 21% determined on 0.5 mm injection moulded plaque samples according to ASTM D1003.

The preferred high values for Charpy notched impact strength indicate excellent impact properties of the polypropylene resin even at low temperatures and maintaining at the same time low haze.

The heterophasic polypropylene resin preferably is obtainable by a multistage process. Multistage processes include also bulk/gas phase reactors known as multizone gas phase reactors. In a preferred embodiment the heterophasic polypropylene resin is obtained by a quadruple stage reactor process.

Thus, the present invention is concerned with a heterophasic polypropylene resin obtainable by a quadruple stage reactor process, whereby
　the first reactor is a loop reactor operated under conditions to produce a propylene homo- or copolymer (A) being composed of propylene monomer units in an amount of at least 95 wt.-%, and an MFR (2.16 kg, 230° C.) of more than 60 g/10 min, and a xylene solubility of 3.0 wt. % or less,
　the obtained product from the bulk reactor being fed to a first gas phase reactor
　the first gas phase reactor being operated
　　at a temperature of 65 to 75° C.,
　　a pressure of 1900 to 2300 kPa, and a H2/C3 ratio of 10 to 16 mol/kmol,
a C2/C3 ratio of 1100 to 1500 mol/kmol
the obtained product from the first gas phase reactor then being fed to a second gas phase reactor,
the second gas phase reactor being operated
at a temperature of ±10° C. when compared with the first gas phase reactor,
at a pressure of 1800 to 2300 kPa,
a C2/C3 ratio of 1600 to 2000 mol/kmol,
a H2/C2 ratio mol/kmol of 400 to 500 mol/kmol
the obtained product from the second gas phase reactor being fed to a third gas phase reactor,
the third gas phase reactor being operated
at a temperature of 5° C. to 15° C. higher than the temperature in the first gas phase reactor,
at a pressure of 2300 to 2700 kPa,
a C2/C3 ratio of 300 to 420 mol/kmol,
a H2/C2 ratio of 375 to 450 mol/kmol
optionally subjecting the product from the third gas phase reactor to a degassing step,
and compounding the product obtained from the third gas phase reactor or the degassed product in an amount of 70.5 to 84.5 wt.-% with respect to the final heterophasic polypropylene resin
with an ethylene homo- or copolymer having a density measured according to ISO 1183 of less than 930 kg/m$^3$ in an amount of 15 to 24.5 wt.-% with respect to the final heterophasic polypropylene resin
in the presence of stabilisers in an amount of 0.5 to 5.0 wt.-% with respect to the final heterophasic polypropylene resin.

The present invention is also concerned with a process as described above and in the following.

The ethylene homo- or copolymer having a density measured according to ISO 1183 of less than 930 kg/m$^3$ preferably has a fraction soluble in p-xylene at 25° C. (XCS) in an amount of below 5 wt.-%, more preferably below 3.5 wt.-% and most preferably below 2.5 wt.-%.

The ethylene homo- or copolymer having a density measured according to ISO 1183 of less than 930 kg/m$^3$ is preferably composed of more than 90 wt.-% ethylene monomer units, more preferably more than 95 wt.-% ethylene monomer units and most preferably more than 99 wt.-% ethylene monomer units.

The first reactor is a bulk reactor operated under conditions to produce a propylene homo- or copolymer (A) being composed of propylene monomer units in an amount of at least 95 mol %, and an MFR (2.16 kg, 230° C.) of more than 60 g/10 min, and a xylene cold solubility of 3.0 wt. % or less.

Preferably, in the process for producing the heterophasic polypropylene the bulk reactor (first reaction stage) is operated under the following conditions:

The temperature is within the range of 50° C. to 90° C., preferably between 60° C. and 80° C., most preferably 65 to 75° C. The pressure preferably is within the range of 5000 to 6000 kPa, more preferably 5100 to 5500 kPa. The control of the molecular weight of the material obtained in the first reaction stage is preferably achieved by hydrogen addition. The H2/C3 ratio (mol/kmol) is preferably in the range of 10 to 15. The bulk reactor preferably is a loop reactor.

Then the obtained product from the bulk reactor is fed to a first gas phase reactor. This first gas phase reactor is preferably operated under the following conditions: The temperature preferably is between 65 to 82° C., more preferably 67 to 75° C. and most preferably from 68 to 73° C. The pressure preferably is 1950 to 2250 kPa, and most preferably 2000-2200 kPa. The H$_2$/C$_3$ ratio preferably is 11 to 15 mol/kmol, and most preferably is 12 to 14 mol/kmol. The C$_2$/C$_3$ ratio preferably is 1100 to 1400 mol/kmol, more preferably is 1100 to 1350 mol/kmol, and most preferably 1150 to 1300 mol/kmol.

In an alternative embodiment this first gas phase reactor can be replaced by a loop reactor. Thus the heterophasic polypropylene resin according to the present invention is also obtainable by a quadruple stage reactor process, whereby the reactor sequence is a loop/loop/gas-phase/gas-phase sequence.

The obtained product from said first gas phase reactor (or in the alternative embodiment the second loop reactor) is then fed to a second (further) gas phase reactor. This second (further) gas phase reactor is operated under the following conditions.

The reaction temperature of the second (further) gas phase reactor is up to ±10° C. when compared with the first gas phase reactor temperature in first gas reactor. The pressure preferably is in the range of 1800 to 2300 kPa, more preferably in the range of 1850 to 2250 kPa, and most preferably in the range of 1860 to 2000 kPa. The C$_2$/C$_3$ ratio preferably is in the range of 1650 to 1900 mol/kmol, preferably form 1700 to 1850 mol/kmol, most preferably from 1750 to 1800 mol/kmol. The H$_2$/C$_2$ ratio preferably is in the range of 400 to 480 mol/kmol.

The obtained product from said second gas phase reactor is then fed to a third gas phase reactor. This third gas phase reactor is operated under the following conditions:

The reaction temperature of the third gas phase reactor is 5 to 15° C. when compared with temperature in the first gas reactor. The pressure preferably is in the range of 2350 to 2700 kPa, more preferably in the range of 2400 to 2650 kPa, and most preferably in the range of 2400 to 2600 kPa. The C$_2$/C$_3$ ratio preferably is in the range of 320 to 400 mol/kmol, preferably form 330 to 390 mol/kmol, most preferably from 340 to 380 mol/kmol. The H$_2$/C$_2$ ratio is in the range of 375 to 450 and preferably 390 to 450 mol/kmol.

The reactor splits, i.e. the amount of material produced in the reactors is preferably 45-55/55-45 for the 1st and 2nd reactor and 55-65/35-45 for the 3rd and 4th reactor.

The production in the second and third gas phase may be changed, i.e. the second gas phase reactor may be operated under the conditions given for the third gas phase reactor and simultaneously the third gas phase reactor may be operated under the conditions given for the second gas phase reactor.

Typically 35 to 45 wt.-% of the material obtained in the reactor cascade will be made in first reactor 1, about 35 to 45 wt.-% of the second reactor, about 7 to 13 wt.-% of the material in the 3rd reactor and about 4 to 9 wt.-% in the 4th reactor.

Optionally, the process may also comprise a pre-polymerisation step in a manner known in the field and which may precede the first polymerisation stage.

The process is preferably a continuous process.

The average residence time can vary in the reaction stages. In one embodiment of the process for producing the propylene polymer the residence time in bulk reactor, preferably in a loop reactor, is in the range 0.5 to 5 hours, e.g. 0.5 to 2 hours.

The residence time in the first gas phase reactor will generally be ½ to 4 hours, preferably 1 to 2 hours.

The residence time in the second gas phase reactor will generally be 1 to 5 hours.

The residence time in the third gas phase reactor will generally be 1 to 5 hours.

If desired, the polymerization may be effected in a known manner under supercritical conditions in the bulk, preferably loop reactor, and/or as a condensed mode in the gas phase reactor.

The heterophasic polypropylene resin according to this invention is preferably produced by a ZN catalyst system comprising an external donor.

Preferably, the ZN catalyst system has a Al/Ti ratio of 200 or higher, even more preferably 220-400, most preferably 230-300.

Preferably, the ZN catalyst system has an Al/donor ratio of below 2 to 8 [mol/mol], more preferably 3 to 7 [mol/mol].

The material obtained from the 3rd gas phase reactor is compounded in an amount of 70.5 to 84.5 wt.-% with an ethylene homo- or copolymer having a density measured according to ISO 1183 of less than 930 kg/m$^3$ in an amount of 15 to 24.5 wt.-%. The compounding is carried out in the presence of stabilisers in an amount of 0.5 to 5 wt.-%, all amounts with respect to the total heterophasic polypropylene resin.

The stabilizers are preferably selected from the group of UV-stabilizers, antioxidants and slip agents.

The ethylene homo- or copolymer having a density measured according to ISO 1183 of less than 930 kg/m$^3$ preferably has a melt flow rate at a load of 2.16 kg (ISO 1133) of 10 to 50 g/min, more preferably 10 to 40 g/10 min and most preferably 12 to 25 g/10 min. Moreover, the ethylene polymer having a density measured according to ISO 1183 of less than 930 kg/m$^3$ is preferably an ethylene homopolymer.

In a further aspect, the present invention is concerned with a heterophasic polypropylene composition comprising, preferably consisting of the inventive heterophasic polypropylene resin and a least one nucleating agent in an amount of 0.1 to 5 wt.-% and/or at least one additive in an amount of up to 1 wt.-% and/or at least one impact modifier in an amount of up to 10 wt.-% with respect to the total heterophasic polypropylene composition.

The nucleating agent and/or modifiers and/or additives may be included during the polymerisation process and/or after the polymerisation by melt mixing.

The nucleating agent according to the present invention is preferably a α-nucleating agent, more preferably a α-nucleating agent selected from the group consisting of (i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and C1-C8-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl)phosphate or aluminium-hydroxy-bis[2,2'-methylene-bis(4,6-di-t-butylphenyl)phosphate], and
(iv) vinylcycloalkane polymer and vinylalkane polymer, and
(v) mixtures thereof.

Nucleating agents from groups (ii) and (iv) are particularly preferred. It is known in the art that such nucleating agents can be introduced during a prepolymerization step.

It is preferred that the heterophasic polypropylene composition does not contain further polymers other than polymers selected from the group of polyethylene homo- or copolymers having a comonomer content, i.e. composed of structural units other than C2, of below 5 mol %.

Most preferably the heterophasic polypropylene composition consists of the inventive heterophasic polypropylene resin and a least one nucleating agent in an amount of 0.1 to 5 wt.-% and/or at least one additive in an amount of up to 1 wt.-% and/or at least one impact modifier in an amount of up to 10 wt.-% with respect to the total heterophasic polypropylene composition.

The impact modifiers are preferably selected from the group of C2C4 elastomers, C2C8 elastomers. Most preferably the impact modifiers are selected from C2C8 elastomers.

It is further preferred that the impact modifiers are contained in an amount of below 5 wt.-% more preferably below 3 wt.-% with respect to the total composition.

Suitable additives include stabilizers, lubricants, pigments and foaming agents. Preferably the additives are selected from the group of stabilizers, lubricants, pigments and foaming agents.

Further, the present invention relates to articles comprising the heterophasic polypropylene resin or the heterophasic polypropylene composition according to the invention produced by any common conversion process suitable for thermoplastic polymers like injection moulding, extrusion blow moulding, injection stretch blow moulding or cast film extrusion. The articles preferably are thin-walled articles having a wall thickness of 300 micrometer to 2 mm. More preferably the thin-walled articles have a wall thickness of 300 micrometer to 1400 micrometer, and even more preferably the thin-walled articles have a wall thickness of 300 micrometer to 900 micrometer.

In the following, the present invention is described by way of examples.

Measurement Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg for polypropylenes and at 190° C. for polyethylenes.

b) Xylene Soluble Fraction and Amorphous Phase

The xylene soluble fraction (XCS) as defined and described in the present invention is determined as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XCS\% = (100 \times m_1 \times v_0)/(m_0 \times v_1),$$

wherein $m_0$ designates the initial polymer amount (grams), $m_1$ defines the weight of residue (grams), $v_0$ defines the initial volume (milliliter) and $v_1$ defines the volume of the analysed sample (milliliter).

The fraction insoluble in p-xylene at 25° C. (XCU) is then equal to 100%-XCS %.

The solution from the second 100 ml flask was treated with 200 ml of acetone under vigorous stirring. The precipitate was filtered and dried in a vacuum oven at 90° C. This solution can be employed in order to determine the amorphous part (AM) of the polymer (wt.-%) using the following equation:

$$AM=(100 \times m_1 \times v_0)/(m_0 \times v_1)$$

wherein $m_0$ designates the initial polymer amount (g), $m_1$ defines the weight of residue (g), $v_0$ defines the initial volume (ml) and $v_1$ defines the volume of the analyzed sample (ml).

c) Intrinsic Viscosity

The intrinsic viscosity (IV) value increases with the molecular weight of a polymer. The intrinsic viscosity of the XCU and the XCS fraction is measured in decalin at 135° C. according to DIN EN ISO 1628-1 and -3.

d) Weight Average Molecular Weight and MWD

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 ml/min. 216.5 µl of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 ml (at 160° C.) of stabilized TCB (same as mobile phase) and keeping for 3 hours with continuous shaking prior sampling in into the GPC instrument.

In case of PP the constants are: K: $19 \times 10^{-3}$ ml/g and a: 0.725 for PP e) Charpy Notched Impact Strength Charpy impact strength was determined according to ISO 179-1eA:2000 on V-notched samples of 80×10×4 mm at 23° C. (Charpy impact strength (23° C.)) and −20° C. (Charpy impact strength (−20° C.)). When not otherwise stated a standard impact velocity of 2.9 m/s was used.

The test specimens were prepared by injection moulding using an IM V 60 TECH machinery in line with ISO 1873-2. The melt temperature was 200° C. and the mold temperature was 40° C.

f) Tensile Modulus, Tensile Strength

The tensile strength, including tensile stress at yield, strain at yield and elongation at break, is measured according to ISO 527-1. (cross head speed 50 mm/min). The tensile modulus is measured according to ISO 527-1 (cross head speed 1 mm/min) using injection molded specimens according to ISO 527-2(1B), produced according to EN ISO 1873-2 (dog bone shape, 4 mm thickness).

g) Haze

Haze and transparency are determined from 1 mm or 0.5 mm injection molded plaque samples according to ASTM D1003-A using a hazegard+hazemeter byk-gardner.

h) Puncture Energy

The puncture energy is measured in biaxial penetration tests according to ISO 6603-2 at 23° C. and at −20° C. using a lubricated bolt on plaques, 60×60×2 mm³, injection moulded according to ISO 1873-2, with a test-speed of 4.4 m/sec.

EXAMPLES

A polymer has been produced in four reactors connected in series. The properties of the products obtained from the individual reactors are given in Tables 1. In said Example the first fraction has been produced in a loop reactor, fractions two to four have been produced in gas phase reactors.

The properties of the products obtained from the individual reactors naturally are not measured on homogenized material but on reactor samples (spot samples). The properties of the final resin are measured on homogenized material, the $MFR_2$ on pellets made thereof.

The catalyst used in the polymerization processes was the commercial BCF20P catalyst (1.9 wt.-% Ti-Ziegler-Natta-catalyst as described in EP 591 224) of Borealis with triethyl-aluminium (TEA) as co-catalyst and dicyclo pentyl dimethoxy silane as donor.

The Al/donor D ratio was 5 mol/mol.

TABLE 1

|  | Base polymer |
| --- | --- |
| Loop reactor |  |
| $MFR_2$/g/10 min/dl/g | 70 |
| Xylene solubles/wt.-% | 1.4 |
| Ethylene content/wt.-% |  |
| Amount of polymer made in loop/wt.-% | 41.5 |
| Gas phase reactor $GPR_1$ |  |
| calculated $MFR_2$ g/10 min for the product obtained in GPR1* | 80 |
| Amount of polymer made in GPR1/wt.-% | 41.5 |
| Xylene solubles/wt.-% made in GPR1 | 3.8 |
| Ethylene content/wt.-% of material made in GPR1 | 2.2 |
| Xylene solubles (total)/wt.-% | 2.6 |
| $MFR_2$ total/g/10 min | 75 |
| Ethylene content total/wt.-% | 1.1 |
| Gas phase reactor $GPR_2$ |  |
| $MFR_2$/g/10 min | 51 |
| xylene soluble (total)/wt.-% | 13.7 |
| ethylene content of the XCS produced in GPR2/wt.-% | 65 |
| Intrinsic viscosity XS/dl/g | 1.4 |
| Amount of polymer made in GPR2/wt.-% | 10.5 |
| Gas phase reactor GPR3 |  |
| $MFR_2$/g/10 min | 43 |
| Xylene solubles total/wt.-% | 20.1 |
| Amount of polymer made in GPR3/wt.-% | 6.5 |
| ethylene content of the XCS produced in GPR3/wt.-% | 20 |
| Intrinsic viscosity $XS_{total}$/dl/g | 1.7 |
| Ethylene content of XCS total after GPR3/wt.-% | 49 |

*The MFR is measured after each reactor. That means that MFR of Reactor 1 as well as the total MFR are measured values. The values of reactor 2 is formally calculated according to:

$$MFR(PP2) = 10^{\left[\frac{\log(MFR(R2))-w(PP1) \times \log(MFR(PP1))}{w(PP2)}\right]}$$

wherein
w(PP1) is the weight fraction of the first polypropylene fraction (PP1), i.e. the product of the first reactor (R1),
w(PP2) is the weight fraction of the second polypropylene fraction (PP2), i.e. of the polymer produced in the second reactor (R2),
MFR(PP1) is the melt flow rate $MFR_2$ (230° C.) [in g/10 min] measured according ISO 1133 of the first polypropylene fraction (PP1), i.e. of the product of the first reactor (R1),
MFR(R2) is the melt flow rate $MFR_2$ (230° C.) [in g/10 min] measured according ISO 1133 of thr product obtained in the second reactor (R2), i.e. the mixture of the first polypropylene fraction (PP1) and the second polypropylene fraction (PP2),
MFR(PP2) is the calculated melt flow rate $MFR_2$ (230° C.) [in g/10 min] of the second polypropylene fraction (PP2).

TABLE 2 shows the polymerization conditions.

|  | Process conditions for the preparation of the base polymer |
| --- | --- |
| Al/Donor [mol/mol] | 5 |
| T(R1) [° C.] | 70 |
| p(R1) [kPa] | 5300 |

TABLE 2-continued shows the polymerization conditions.

| | Process conditions for the preparation of the base polymer |
|---|---|
| H2/C3 ratio [mol/kmol] in R1 Gpr1 | 13 |
| T(R2) [° C.] | 70 |
| p(R2) [kPa] | 2100 |
| H2/C3 ratio [mol/kmol] in R2 | 13 |
| C2-feed in R2 [kg/h] in R2 | 44 |
| C2/C3 ratio [mol/kmol] in R2 Gpr2 | 1270 |
| T(R3) [° C.] | 70 |
| p(R3) [kPa] | 2100 |
| C2-feed in R2 [kg/h] in R3 | 54 |
| H2/C2 ratio [mol/kmol] in R3 | 570 |
| C2/C3 ratio [mol/kmol] in R3 Gpr3 | 1780 |
| T(R4) [° C.] | 80 |
| p(R4) [kPa] | 2460 |
| C2-feed in R2 [kg/h] in R4 | 18 |
| H2/C2 ratio [mol/kmol] in R4 | 450 |
| C2/C3 ratio [mol/kmol] in R4 | 360 |

All examples were compounded on a co-rotating twin-screw extruder (Thermo-Prism TSE24) of 24 mm screw diameter and a length to diameter ratio of 48 with a high-intensity mixing screw and a temperature profile at 180-220° C. with a throughput of 10 kg/h and a screw speed of 50 rpm.

The composition of the comparative examples as well as of the inventive examples is shown in table 3.

TABLE 3

Composition of comparative and inventive examples

| Component/wt.-% | CE2 | CE3 | IE1 | IE2 |
|---|---|---|---|---|
| Base polymer | 81.8 | 81.8 | 82.8 | 82.8 |
| Millad 3998 | 0.2 | 0.2 | 0.2 | 0.2 |
| CA9150 | | | 17 | 15 |
| VS5580 | 18 | 15 | | |
| Engage 8411 | | 3 | | |
| Engage 8400 | | | | 2 |

Millad 3988 (supplied by Milliken Inc.) is 1,3:2,4 Bis(3,4-dimethylbenzylidene)sorbitol, CAS-No. 135861-56-2.

CA9150 is a low density ethylene homopolymer having an MFR2 (190° C., 2.16 kg) of 15 g/10 min and a density of 915 kg/m3 and is commercially available from Borealis.

VS5580 is a high density ethylene homopolymer having an MFR2 (190° C., 2.16 kg) of 0.95 g/10 min and a density of 958 kg/m3 and is commercially available from Borealis.

Engage 8411 is an ethylene-octene copolymer having a density of 880 kg/m3 and an MFR2 (190° C., 2.16 kg) of 18 g/10 min, and is commercially available from Dow Chemical.

Engage 8400 is an ethylene-octene copolymer having a density of 870 kg/m3 and an MFR2 (190° C., 2.16 kg) of 30 g/10 min, and is commercially available from Dow.

Comparative example 1 is an impact-modified polypropylene random copolymer having an MFR2 (230° C., 2.16 kg) of 25 g/10 min, and is commercially available from Borealis under the trade name Borpact SG930MO.

Contrary to all the comparative examples, the inventive examples show increased flowability, see table 4. Although the stiffness impact balance achievable by using the HDPE or a combination of HDPE and plastomer is impressing it leads to a significant increase of the haze values and thus the material is not transparent any more. By using the LDPE or a combination of LDPE and plastomer, the haze values and the flowability could be kept on a high level. Also the impact-stiffness balance of these materials is outperforming that of the actual commercial benchmark SG930MO.

TABLE 4

Properties of comparative and inventive examples

| | CE1 | CE2 | CE3 | IE1 | IE2 |
|---|---|---|---|---|---|
| MFR2/g/10 min | 25 | 24 | 26 | 35 | 35 |
| Tensile Modulus/MPa | 1003 | 1210 | 1161 | 1117 | 1171 |
| Tensile Stress at Yield/MPa | 22 | 25 | 24 | 23 | 23 |
| Tensile Strain at Yield/% | 13 | 10 | 11 | 11 | 10 |
| Tensile Strength/MPa | 22 | 25 | 24 | 23 | 23 |
| Strain at Tensile Strength/% | 13 | 10 | 11 | 11 | 10 |
| Stress at Break/MPa | 13 | 11 | 6 | 11 | 6 |
| Tensile Strain at Break/% | 396 | 135 | 233 | 426 | 302 |
| Charpy/kJ/m2, 23° C. | 7.6 | 8.0 | 9.2 | 8.2 | 8.1 |
| Charpy/kJ/m2, −20° C. | 2 | 2.2 | 3.0 | 2.2 | 3.3 |
| Transparency (60 * 60 * 1 mm)/% | 83 | 72 | 73 | 82 | 82 |
| Haze (60 * 60 * 1 mm)/% | 41 | 96 | 94 | 45 | 43 |
| Clarity (60 * 60 * 1 mm)/% | 96 | 45 | 54 | 94 | 94 |
| Transparency (60 * 60 * 0.5 mm)/% | 89 | 81 | 82 | 89 | 89 |
| Haze (60 * 60 * 0.5 mm)/% | 19 | 72 | 67 | 20 | 20 |
| Clarity (60 * 60 * 0.5 mm)/% | 98 | 72 | 70 | 96 | 96 |
| Puncture Energy/J, 23° C. | 24 | 25 | 24 | 23 | 23 |
| Puncture Energy/J, −20° C. | 7 | 22 | 19 | 29 | 27 |

TABLE 5 provides details as to molecular weight, Tg, Mw/Mn and
C2 content of the total composition and the XCS and XCU fraction.

| Total composition | MFR/ g/min | XCS/wt.-% | C2 total/ wt.-% |
|---|---|---|---|
| IE1 | 35 | 17.3 | 29.3 |
| IE2 | 35 | 19.4 | 30.4 |
| CE2 | 24 | 17 | 34 |
| CE3 | 26 | 20 | 32.1 |
| CE1 | 25 | 14.9 | 27.2 |

| XCS fraction | Tg/° C. | C2 content wt.-% | Mn/ kg/mol | Mw/ Kg/mol | Mw/Mn |
|---|---|---|---|---|---|
| IE1 | −54 | 44.74 | 27 | 150 | 5.5 |
| IE2 | −54 | 49.1 | 31 | 147 | 4.7 |
| CE2 | −55 | 45.2 | 36 | 157 | 4.3 |
| CE3 | −55 | 51.4 | 37 | 146 | 4 |

| XCU fraction | IV/dl/g | C2 content wt.-% | Mn/ kg/mol | Mw/ Kg/mol | Mw/Mn |
|---|---|---|---|---|---|
| IE1 | 1.7 | 18.7 | 31 | 148 | 4.8 |
| IE2 | 1.7 | 18.1 | 31 | 147 | 4.9 |
| CE2 |  | 24.4 | 32 | 147 | 4.9 |
| CE3 |  | 21.7 | 31 | 147 | 4.8 |

The invention claimed is:

1. Heterophasic polypropylene resin having an MFR (2.16 kg, 230° C.) of more than 27 g/10 min, determined according to ISO 1133 comprising
a propylene homo- or copolymer matrix (A) and an ethylene-propylene rubber phase (B) dispersed within the matrix,
wherein the heterophasic polypropylene resin has
a fraction insoluble in p-xylene at 25° C. (XCU) in an amount of 75 to 85 wt.-% with a weight average molecular weight of 110 to 190 kg/mol measured by GPC analysis according to ISO 16014-1, and 4, the fraction insoluble in p-xylene at 25° C. (XCU) containing monomer units derived from ethylene in an amount of 12.0 to 21.0 wt.-% and
a fraction soluble in p-xylene at 25° C. (XCS) in an amount of 15 to 25 wt.-% having an intrinsic viscosity of 1.4 to 2.0 dl/g, determined according to DIN EN ISO 1628-1 and -3 and being composed of propylene monomer units in an amount of 40 wt.-% or more, and having a glass transition temperature Tg as measured by DSC according to ISO 6721-7 at a compression moulded sample consisting of the XCS fraction in the range of −60 to −50° C.

2. Heterophasic polypropylene resin according to claim 1, wherein the XCU fraction has a weight average molecular weight Mw of 125 to 175 kg/mol, measured by GPC according to ISO 16014-1, and 4.

3. Heterophasic polypropylene resin according to claim 1, wherein the XCU fraction is present in an amount of 76 to 84 wt.-% of the heterophasic polypropylene resin.

4. Heterophasic polypropylene resin according to claim 1, wherein the XCS fraction has an average molecular weight $M_w$ of 110 to 190 kg/mol, measured by GPC according to ISO 16014-1, and 4.

5. Heterophasic polypropylene resin according to claim 1, wherein the haze of the resin is lower than 50% measured on 1 mm injection moulded plaques.

6. Heterophasic polypropylene resin according to claim 1, wherein the haze of the resin is lower than 25% measured on 0.5 mm injection moulded plaques.

7. Heterophasic polypropylene resin according to claim 1, wherein the resin has a Charpy notched impact strength according to ISO 179/1 eA at ±23° C. of at least 6.5 kJ/m$^2$.

8. Heterophasic polypropylene resin according to claim 1, wherein the resin has a Charpy notched impact strength according to ISO 179/1 eA at −20° C. of at least 1.6 kJ/m$^2$.

9. Heterophasic polypropylene resin according to claim 1, wherein the resin has a puncture energy at 23° C. of at least 16 J, determined according to ISO 6603-2.

10. Heterophasic polypropylene resin according to claim 1, wherein the resin has a puncture energy at −20° C. of at least 20 J, determined according to ISO 6603-2.

11. Heterophasic polypropylene resin according to claim 1, wherein the tensile modulus measured according to ISO 527-2 on injection moulded specimens of type 1B(F3/4) prepared in accordance with EN ISO 1873-2 is 1100 MPa or higher.

12. Heterophasic polypropylene resin according to claim 1 being produced in the presence of a Ziegler-Natta catalyst system comprising an external donor with an Al/donor ratio of 2 to 8.

13. A method for obtaining a heterophasic polypropylene resin having an MFR (2.16 kg, 230° C.) of more than 27 g/10 min, determined according to ISO 1133, by a quadruple stage reactor process, the method comprising:
operating a first loop reactor under conditions to produce a propylene homo- or copolymer (A) being composed of propylene monomer units in an amount of at least 95 wt.-%, and an MFR (2.16 kg, 230° C.) of more than 60 g/10 min, and a xylene solubility of 3.0 wt. % or less,
feeding the obtained product from the bulk reactor to a first gas phase reactor
the first gas phase reactor being operated
at a temperature of 65 to 75° C.,
a pressure of 1900 to 2300 kPa, and
a H2/C3 ratio of 10 to 16 mol/kmol,
a C2/C3 ratio of 1100 to 1500 mol/kmol
feeding the obtained product from the first gas phase reactor to a second gas phase reactor,
the second gas phase reactor being operated
at a temperature of ±10° C. when compared with the first gas phase reactor,
at a pressure of 1800 to 2300 kPa,
a C2/C3 ratio of 1600 to 2000 mol/kmol,
a H2/C2 ratio mol/kmol of 400 to 500 mol/kmol
feeding the obtained product from the second gas phase reactor to a third gas phase reactor,
the third gas phase reactor being operated
at a temperature of 5° C. to 15° C. higher than the temperature in the first gas phase reactor,
at a pressure of 2300 to 2700 kPa,
a C2/C3 ratio of 300 to 420 mol/kmol,
a H2/C2 ratio of 375 to 450 mol/kmol
optionally subjecting the product from the third gas phase reactor to a degassing step,
and compounding the product obtained from the third gas phase reactor or the degassed product in an amount of 70.5 to 84.5 wt.-% with respect to the final heterophasic polypropylene resin
with an ethylene homo- or copolymer having a density measured according to ISO 1183 of less than 930 kg/m$^3$ in an amount of 15 to 24.5 wt.-% with respect to the final heterophasic polypropylene resin in the presence of stabilisers in an amount of 0.5 to 5.0 wt with respect to the final heterophasic polypropylene resin;

wherein the final heterophasic polypropylene resin has
a fraction insoluble in p-xylene at 25° C. (XCU) in an amount of 75 to 85 wt.-% with a weight average molecular weight of 110 to 190 kg/mol measured by GPC analysis according to ISO 16014-1, and 4, the fraction insoluble in p-xylene at 25° C. (XCU) containing monomer units derived from ethylene in an amount of 12.0 to 21.0 wt.-% and a fraction soluble in p-xylene at 25° C. (XCS) in an amount of 15 to 25 wt.-% having an intrinsic viscosity of 1.4 to 2.0 dl/g, determined according to DIN EN ISO 1628-1 and -3 and being composed of propylene monomer units in an amount of 40 wt.-% or more, and having a glass transition temperature Tg as measured by DSC according to ISO 6721-7 at a compression moulded sample consisting of the XCS fraction in the range of −60 to −50° C.

14. The method of claim 13, wherein the heterophasic polypropylene resin is produced in the presence of a Ziegler-Natta catalyst system comprising an external donor with an Al/donor ratio of 2 to 8.

15. Heterophasic polypropylene composition consisting of
the heterophasic polypropylene resin according to claim 1 and
at least one nucleating agent in an in an amount of 0.1 to 5 wt.-% with respect to the weight of the total heterophasic polypropylene composition, and/or
at least one additive in an amount of up to 1 wt.-% with respect to the heterophasic polypropylene composition, and/or
at least one impact modifier in an amount of up to 10 wt.-% with respect to the heterophasic polypropylene composition.

16. Heterophasic polypropylene composition consisting of
the heterophasic polypropylene resin produced by the method of claim 13 and
at least one nucleating agent in an in an amount of 0.1 to 5 wt.-% with respect to the weight of the total heterophasic polypropylene composition, and/or
at least one additive in an amount of up to 1 wt.-% with respect to the heterophasic polypropylene composition, and/or
at least one impact modifier in an amount of up to 10 wt.-% with respect to the heterophasic polypropylene composition.

17. Article comprising the heterophasic polypropylene resin according to claim 1.

18. Article comprising the heterophasic polypropylene resin produced by the method of claim 13.

19. Article comprising the heterophasic polypropylene composition according to claim 15.

20. Article comprising the heterophasic polypropylene composition according to claim 16.

* * * * *